(12) United States Patent
Brandwine

(10) Patent No.: US 12,067,119 B1
(45) Date of Patent: Aug. 20, 2024

(54) PROVIDING CRYPTOGRAPHIC ATTESTATIONS OF ENCLAVES USED TO PROCESS USER DATA IN A CLOUD PROVIDER NETWORK

(71) Applicant: Amazon Technologies, Inc., Seattle, WA (US)

(72) Inventor: Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 371 days.

(21) Appl. No.: 17/490,244

(22) Filed: Sep. 30, 2021

(51) Int. Cl.
*G06F 21/00* (2013.01)
*G06F 9/455* (2018.01)
*G06F 21/57* (2013.01)
*H04L 9/32* (2006.01)

(52) U.S. Cl.
CPC .......... *G06F 21/57* (2013.01); *G06F 9/45558* (2013.01); *H04L 9/3236* (2013.01); *H04L 9/3247* (2013.01); *H04L 9/3263* (2013.01); *G06F 2009/45587* (2013.01); *G06F 2009/45595* (2013.01)

(58) Field of Classification Search
CPC .............. G06F 21/57; G06F 9/45558; G06F 2009/45587; G06F 2009/45595; H04L 9/3236; H04L 9/3247; H04L 9/3263
See application file for complete search history.

(56) References Cited

U.S. PATENT DOCUMENTS

| | | | |
|---|---|---|---|
| 2018/0232517 A1* | 8/2018 | Roth | G06F 21/53 |
| 2018/0247082 A1* | 8/2018 | Durham | G06F 21/53 |
| 2021/0124823 A1* | 4/2021 | Lidzborski | G06F 21/53 |
| 2022/0247576 A1* | 8/2022 | Beekman | H04L 9/3263 |

* cited by examiner

*Primary Examiner* — Ghazal B Shehni
(74) *Attorney, Agent, or Firm* — Nicholson DeVos Webster & Elliott LLP

(57) ABSTRACT

Techniques are described for enabling users of cloud provider services to verify, via cryptographic attestation, that trusted "enclaves" are used to process user data during limited points in time at which user data may be unencrypted or otherwise vulnerable. A cloud provider service processes requests involving user data at least in part using an enclave, where an enclave includes a virtual machine running on isolated computing resources of a host computing device managed by the cloud provider. The enclave, for example, can include an application that performs operations such as decrypting user data included in requests sent to a service (e.g., user data encrypted as part of a Transport Layer Security (TLS) connection established between the service and a client computing device), obtaining user-specific encryption keys from a key management service or other source, encrypting the user data using the encryption keys, and forwarding the encrypted data for further processing.

20 Claims, 8 Drawing Sheets

US 12,067,119 B1

PROVIDING CRYPTOGRAPHIC ATTESTATIONS OF ENCLAVES USED TO PROCESS USER DATA IN A CLOUD PROVIDER NETWORK

BACKGROUND

Some cloud computing providers enable customers to create isolated compute environments used to protect and securely process highly sensitive data (e.g., healthcare data, financial data, etc.). In these systems, specialized hypervisors can be used to continuously monitor, protect, and verify instance hardware and firmware. Virtualization resources can be further offloaded to dedicated hardware and software, thereby minimizing the attack surface of user computing resources.

BRIEF DESCRIPTION OF DRAWINGS

Various embodiments in accordance with the present disclosure will be described with reference to the drawings, in which.

DETAILED DESCRIPTION

Figure 1:
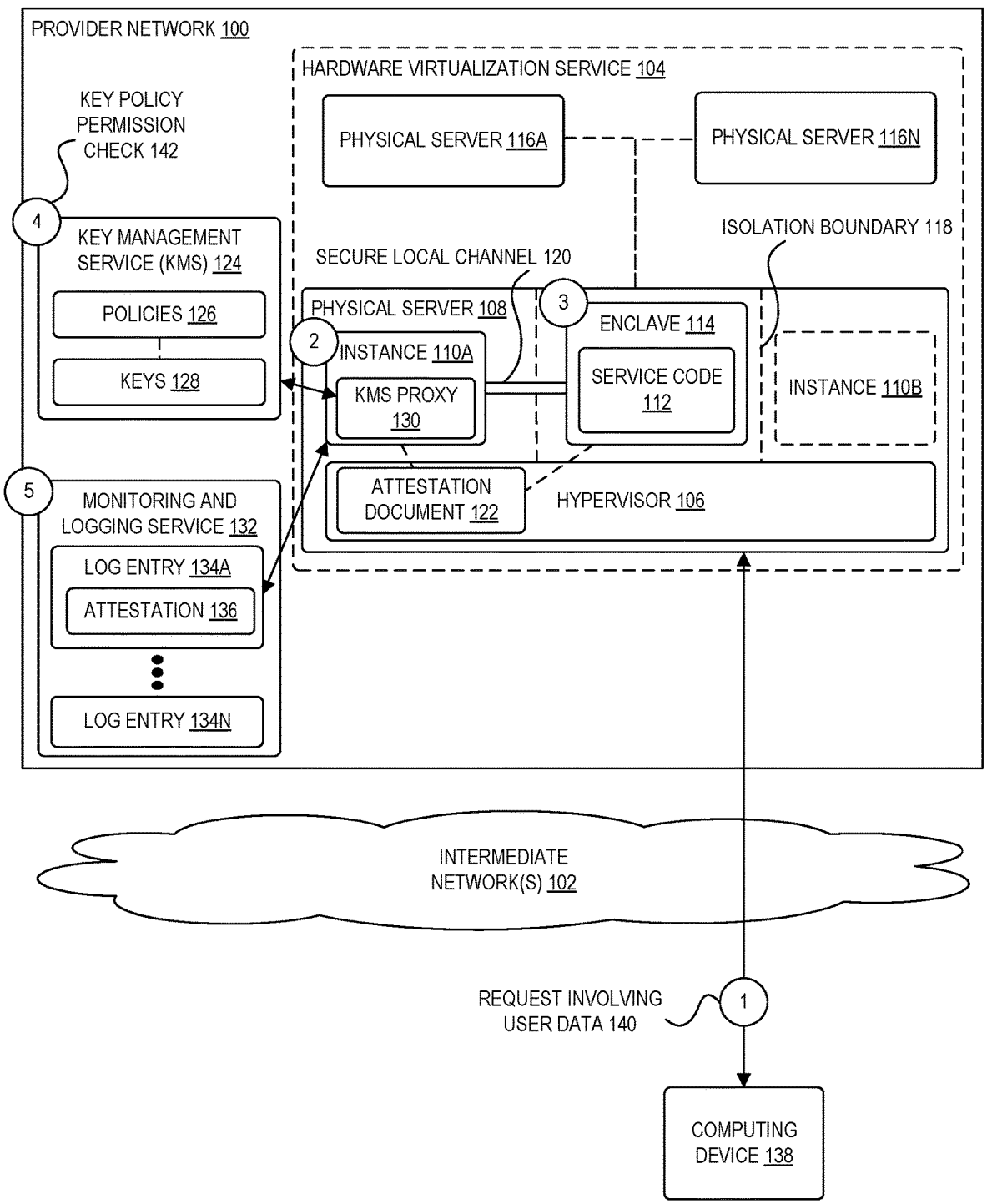
FIG. 1 is a diagram illustrating an environment for enabling users of a cloud provider service to verify, via cryptographic attestation, that a trusted enclave is used to process user data provided to the service according to some embodiments.

The present disclosure relates to methods, apparatus, systems, and non-transitory computer-readable storage media for enabling users of cloud provider services to verify, via cryptographic attestation, that trusted "enclaves" are used to process user data during limited points in time at which user data may be unencrypted (e.g., in plaintext) or otherwise vulnerable. According to embodiments described herein, a cloud provider service (e.g., an object storage service, database service, etc.) processes requests involving user data at least in part using an enclave, where an enclave includes a virtual machine running on isolated computing resources of a host computing device managed by the cloud provider. The enclave, for example, can include an application that performs operations such as decrypting user data included in requests sent to a service (e.g., user data encrypted as part of a Transport Layer Security (TLS) connection established between the service and a client computing device), obtaining user-specific encryption keys from a key management service or other source, encrypting the user data using the encryption keys, and forwarding the encrypted data for further processing.

In some embodiments, as part of processing such requests, a hash digest of the enclave is obtained. The hash digest is generated by a hypervisor hosting the enclave and is based on a set of measurements used to uniquely identify the enclave. The hash digest is further digitally signed by a public key infrastructure (PKI) managed by the cloud provider. Once obtained, the hash digest can be stored in a log entry, returned to a user in a response message, or otherwise made accessible to users desiring to verify the identity of the enclave used to process the request. In some embodiments, the implementation details of the enclave (e.g., source code, build environment, etc.) can be made publicly accessible to users or audited by an external entity to provide users of the cloud provider with assurance that the enclave's operation is secure and that a hash digest of the inspected enclave matches the hash digest generated by the service. Among other benefits, the ability to provide access to cryptographic attestations of enclaves used to process user data provides greater assurance of the end-to-end security of user data in cloud provider networks or other distributed processing systems.

As indicated, cloud computing service providers typically provide a variety of computing services that process user data in some form. As one example, many cloud service providers provide an object storage service that enables users to store user data for use cases such as data lakes, websites, mobile applications, backup and restore, etc. An object storage service typically provides interfaces that users can use to store and retrieve data managed by the service on behalf of users. Users of such services often desire assurance that user data provided to and processed by the services is handled securely. Users can take some steps to protect their data both while in-transit (as it travels to and from a service) and at rest (e.g., while it is stored on disks by a service). For example, users can protect data in transit using Secure Socket Layer/Transport Layer Security (SSL/TLS) or client-side encryption.

To protect data at rest, users can use server-side encryption or client-side encryption. In this context, for example, server-side encryption can include the encryption of data at its destination by a cloud provider service. For example, an object storage service can encrypt users' data at the object level as it writes the data to disks in its data centers and can decrypt the data when users access the data. One way of performing server-side encryption involves the use of a key management service (or "KMS"). In some examples, a KMS is a service that provides a key management system as a cloud-based service where, for example, a data object service or other service can use the KMS to manage customer master keys (or "CMKs") to encrypt and decrypt users' stored data objects.

However, between the security of data in transit and at rest (e.g., between the point at which an SSL/TLS connection carrying user data is terminated and the point at which the user data is encrypted using server-side encryption), there sometimes exists application logic where user data is potentially vulnerable, albeit briefly, to access in plaintext (e.g., in an unencrypted state). Although the execution of this application logic is typically protected by numerous security measures, some users may desire additional assurance of data security in this processing phase.

To address these challenges, among others, techniques are described herein for executing a portion of the software implementing a cloud provider service in an isolated computing environment (or "enclave") and for enabling users to verify that data provided to the service is handled by a trusted enclave certain points in time. As indicated above, in some examples, the trustworthiness of an enclave is established either by making the source code and build environment of the enclave publicly accessible (e.g., such that a hash digest of the enclave can be obtained and used for comparison to a hash digest of an enclave used by a cloud provider service), providing access to third party audit reports of an enclave, or the like. These techniques provide for additional data security and user verifiability and assurance of such security, among other benefits described herein.

FIG. 1 is a diagram illustrating an environment for providing access to cryptographic attestations of enclaves used by a cloud provider service to process user data according to some embodiments. A provider network 100 (or "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 102 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably. AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance." such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally. or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

In some examples, a provider network 100 includes an on-demand code execution service (referred to in various embodiments as a function compute service, functions service, cloud functions service, functions as a service, or serverless computing service) that can enable users of the provider network 100 to execute their code on cloud resources without having to select or manage the underlying hardware resources used to execute the code. For example, a user can use the on-demand code execution service by uploading their code and use one or more APIs to request that the service identify, provision, and manage any resources required to run the code.

The hardware virtualization service 104 (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor 106 running on physical server 108), input/output virtualization to network-attached storage volumes, local migration management tasks, instance health monitoring, and the like). Virtual machines are commonly referred to as compute instances or simply "instances" (e.g., such as example instances 110A and 110B). As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some examples, a provider network 100 includes a container service. A container service, for example, can be a container orchestration and management service (referred to in various implementations as a container service, cloud container service, container engine, or container cloud service) that allows users of the cloud provider network to instantiate and manage containers. In some embodiments the container service can be a Kubernetes-based container orchestration and management service (referred to in various implementations as a container service for Kubernetes. Azure Kubernetes service. IBM cloud Kubernetes service. Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

In FIG. 1, a service (e.g., an object storage service, a database service, etc.) of a provider network 100 is implemented at least in part by software running on physical servers provided by a hardware virtualization service 104 (or optionally on servers that are separate from a hardware virtualization service 104). In some embodiments, at least a portion of the software implementing a service is executed using enclaves provided by the hardware virtualization service 104. In FIG. 1, for example, the implementation of a service involves executing service code 112 within an enclave 114. The service implementation of the service can also involve the use of software running on other instances or physical servers (e.g., physical servers 116A, ..., 116N) which can communicate with a physical server 108 over one or more networks within the provider network 100.

In some embodiments, a hypervisor 106 enables the isolation of CPU and memory of enclaves from users, applications, and libraries on both a parent instance 110A and any other instances running on the same computing device (e.g., instance 110B executing relative to an isolation boundary 118). In some examples, an enclave 114 interfaces with a parent instance 110A via a secure local channel 120. In some embodiments, the secure local channel 120 is a type of socket interface (referred to as a "vsock") that is defined by a context identifier (CID) and port number where, for example, the context identifier is parallel to an IP address in a TCP/IP connection. Vsock uses standard POSIX Sockets APIs (e.g., connect, listen, accept) to communicate with an enclave, and applications can use these APIs to communicate natively over vsock or they can send HTTP requests over vsock through a proxy.

In some embodiments, a hardware virtualization service 104 provides cryptographic attestation of enclaves executed by the service via a hypervisor 106. In this context, cryptographic attestation is a process used to prove the identity of an enclave and to verify that only authorized code is running in an enclave (e.g., that an enclave 114 and service code 112 execute without unexpected alteration). In some embodiments, the attestation process is performed by the hypervisor 106, which can produce a signed attestation document 122 for the enclave to prove its identity to another party or service. The attestation document 122 generated by the hypervisor 106 can include, for example, the enclave's public key, hashes of the enclave image and applications (also referred to herein as "hash digest" of an enclave), etc. The root of trust component for such attestations is the hypervisor 106, which contains information about an enclave, such as its platform configuration registers (PCRs). In some embodiments, attestation documents are signed by a public key infrastructure (PKI) of the hardware virtualization service 104, which includes a published certificate authority that can be incorporated into any service.

In some embodiments, a key management service 124 enables the creation and control of keys used for cryptographic operations. The key management service 124, for example, provides highly available key generation, storage, management, and auditing solutions for users and applications to encrypt or digitally sign data within applications or control the encryption of data across provider network services. In some examples, users can choose to encrypt user data with a service that uses managed root keys that are automatically created in users' account for each service (e.g., for an object storage service, database service, etc., implemented at least in part by service code 112).

In some embodiments, an application can use key management service 124 APIs to encrypt and decrypt data using data keys stored by the key management service 124 and that are protected by users' own keys. In other examples, users can manage their own keys or allow the service to manage the keys on their behalf. To enable users to control access to their keys, users can use key policies (e.g., policies 126) to determine who has permission to use particular keys (e.g., keys 128) and how they can use it. As described in more detail herein, such policies can be used, for example, to allow access to keys only by enclaves associated with measurements that can be verified in an attestation document provided with requests from an enclave.

In some embodiments, service code 112 or other applications running in an enclave 114 can interface with the key management service 124 via a KMS proxy 130. The KMS proxy 130 can be used, for example, because an enclave 114 is not provided with its own network interface and communicates outside of the enclave only via the secure local channel 120 for security reasons. For example, service code 112 can use a KMS proxy 130 to send API requests to the key management service 124 to encrypt or decrypt user data involved in requests sent to the associated services (e.g., in the example of an object storage service, requests to put/store or get/retrieve data objects). It is noted that encryption keys sent, e.g., from the key management service 124 to a requesting enclave via a KMS proxy can be encrypted such that only the intended enclave can decrypt and access the encryption key (e.g., such that the KMS proxy or parent instance cannot access the encryption key).

In some embodiments, a provider network 100 also includes a monitoring and logging service 132 that enables the logging and monitoring of activity associated with user accounts across provider network 100 infrastructure. The monitoring and logging service 132, for example, can create log entries (e.g., log entries 134A, ..., 134N) providing an event history of actions performed by resources, applications, and services running on provider network servers. Users can use a monitoring and logging service 132 to collect and view logs, detect anomalous behavior, and discover other insights into applications. As described in more detail herein, the monitoring and logging service 132 can be used to monitor and log the enclaves used to process user requests (e.g., based on attestation 136 material included in log entries).

In FIG. 1, the numbered circles labeled "1"-"5" illustrate an example process for providing access to cryptographic attestations of enclaves used by a cloud provider service to process user data according to some embodiments. At circle "1," for example, a computing device 138 generates a request 140 including or requesting user data. For example, if the computing device 138 is interacting with an object storage service, the request can include a request to store or "put" a data object into storage, a request to obtain or "get" a data object from storage, or the like. In some embodiments, the request is sent using a secure connection (e.g., an SSL/TLS connection) established between the service and the computing device 138 from which the request originates. The secure connection, for example, provides for the encryption of data included in the requests (e.g., in transit) using a cryptographic protocol.

In some embodiments, at circle "2," the request is received by code executing on an instance 110A. For example, the instance 110A can include a service that implements an HTTP or other API endpoint for receiving requests from other computing devices desiring to interact with the service. In some embodiments, the service code implemented by the instance 110A can involve initially authenticating and authorizing the request, performing request validations, or any other preliminary operations, which may be performed in connection with other applications or services within the provider network 100. In the example of FIG. 1, the code executing on the instance 110A extracts SSL/TLS-encrypted data from the request (e.g., encrypted data including user data to be processed by the service) and provides the SSL/TLS-encrypted data to the service code 112 via the secure local channel 120 for further processing. As indicated, the data remains encrypted while it is transmitted to the enclave 114 (e.g., the SSL/TLS connection is terminated within the enclave) and thus is not processed in unencrypted form outside of the enclave. In this manner, any user data included in the request is in plaintext (e.g., unencrypted) only within the enclave during the request processing.

In some embodiments, at circle "3," the service code 112 of the enclave 114 obtains the TLS-encrypted data from the parent instance 110A and processes the data. For example, in some embodiments, execution of the service code 112 involves decrypting the request data (e.g., using a SSL/TLS session key associated with the request from the computing device 138), optionally obtaining an encryption key from a key management service 124 (e.g., a key 128 associated with a user generating the request and used to encrypt the included in the request), and encrypting the user data using the obtained encryption key before providing the encrypted data back to the instance 110A for further processing, among other possible operations.

For example, at circle "4." the service code 112 requests, from the key management service 124, an encryption key associated with a user account that generated the request. In some embodiments, the service code 112 sends the request to the key management service 124 via a KMS proxy 130 running on the parent instance 110A (e.g., by sending a request through the secure local channel 120). To generate this request, in some embodiments, the service code 112 obtains attestation data from the hypervisor 106 (including, e.g., a hash digest identifying the enclave 114) and includes the attestation data in the request forwarded to the key management service 124. As indicated above, users can create a policy 126 including conditions that are based on an enclave's measurements as indicated in an attestation document to restrict the use of a key 128 to one or more particular enclaves. In this manner, a user's data can be encrypted/decrypted by only enclaves trusted by the user associated with the data processed by the service. As indicated, if the key management service 124 determines that the requesting enclave is permitted to receive the requested encryption key, the key management service 124 can encrypt the requested encryption key such that only the enclave can access the encryption key, thereby ensuring that the intermediary KMS proxy 130 or parent instance 110A cannot access the encryption key.

In some embodiments, once an encryption key is obtained by the service code 112, the service code can encrypt the user data with the obtained key and provide the data encrypted with the user back to the instance 110A. Once received by the parent instance 110A, the service can further process the data (e.g., including performing one or more operations on the data, storing the data, etc.), where such processing can involve sending the data to other servers (e.g., one or more of physical server 116A, . . . , physical server 116N). In some embodiments, at circle "5," the service code 112 or other component generates a log entry containing attestation-related data (e.g., hash digest) of the enclave 114. For example, a log entry 134A can include attestation data 136 indicating that the user data was processed using the enclave 114 such that a user can verify that a trusted enclave was used. In other examples, the service receiving the request 140 can additionally or alternatively send a response back (e.g., a "200 OK" message) including attestation-related data. In some embodiments, the log entries stored at a monitoring logging service 132, response messages sent back to a requesting user device, or both, can be digitally signed by the PKI infrastructure to enable their authenticity to be verified.

Although a single enclave 114 is shown in the processing of a request in FIG. 1, in other examples, a plurality of enclaves can be used to process a request. For example, each of a plurality of enclaves can be used to implement different subsets of the total set of operations performed to process a particular type of request, where the subset of operations implemented by each enclave may be performed at a different point in the overall processing flow. In this example, each enclave can run on a same or different host computing device depending on the implementation of the service. In some embodiments, if a plurality of enclaves are used, a corresponding plurality of hash digests can be obtained and access to the plurality of hash digests can be provided (e.g., in a response message, log entry, etc.).

Figure 2:
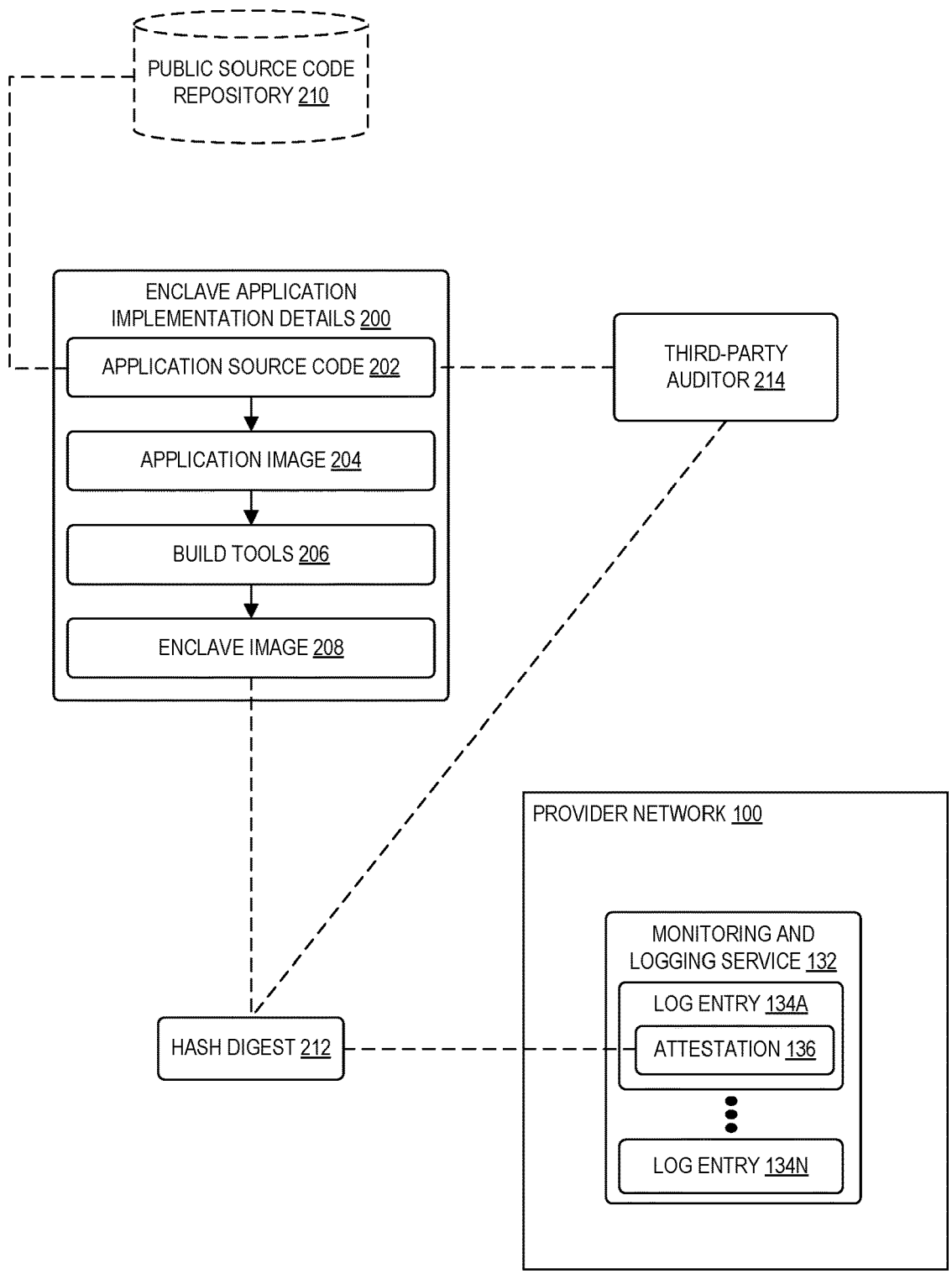
FIG. 2 is a diagram illustrating techniques for enabling users to verify the identity of an enclave used by a cloud provider service to process user data according to some embodiments.

FIG. 2 is a diagram illustrating techniques for enabling users to verify the identity of an enclave used by a cloud provider service to process user data according to some embodiments. As shown, an enclave used by a provider network 100 is associated with enclave application implementation details 200, including application source code 202, an application image 204, build tools 206, and an enclave image 208. In this example, a user can first package their enclave application and its dependencies into an application image 204, which is a read-only template providing instructions for creating a container. In the example of FIG. 2, build tools 206 can then be used to create an enclave image 208 from the application image 204, where the enclave image can be used to launch the enclave on a parent instance (e.g., to launch an enclave 114 from a parent instance 110A, as in FIG. 1).

In the example of FIG. 2, the application source code 202 used to implement the enclave application (e.g., the application implementing at least a portion of a service provided by the provider network 100) is optionally stored in a public source code repository 210. In this example, the source code can be publicly inspected by any user desiring to use the service and to obtain assurance that the code performs acceptable operations relative to user data. Furthermore, the publicly available source code can be used to independently create an enclave image 208 using the build tools 206, where this enclave image can be used to obtain a hash digest 212 identifying the enclave. As shown in FIG. 2, this independently created hash digest 212, for example, can be compared to a hash digest included in attestation data stored in log entries or in response messages provided by a service of the provider network 100, as described with respect to FIG. 1. In this manner, a user can gain assurance that the enclave application implementation details 200 made publicly available to the user are the same as those used to create the enclave application used by a service of the provider network 100.

In other examples, instead of, or in addition to, making the enclave application implementation details 200 publicly available, the implementation details can be provided to a trusted third-party auditor 214 that can analyze the implementation details for security and other purposes. The third-party auditor can similarly provide a hash digest 212 based on the implementation details indicating a trusted version of the enclave that can be used for comparison purposes.

Figure 3:
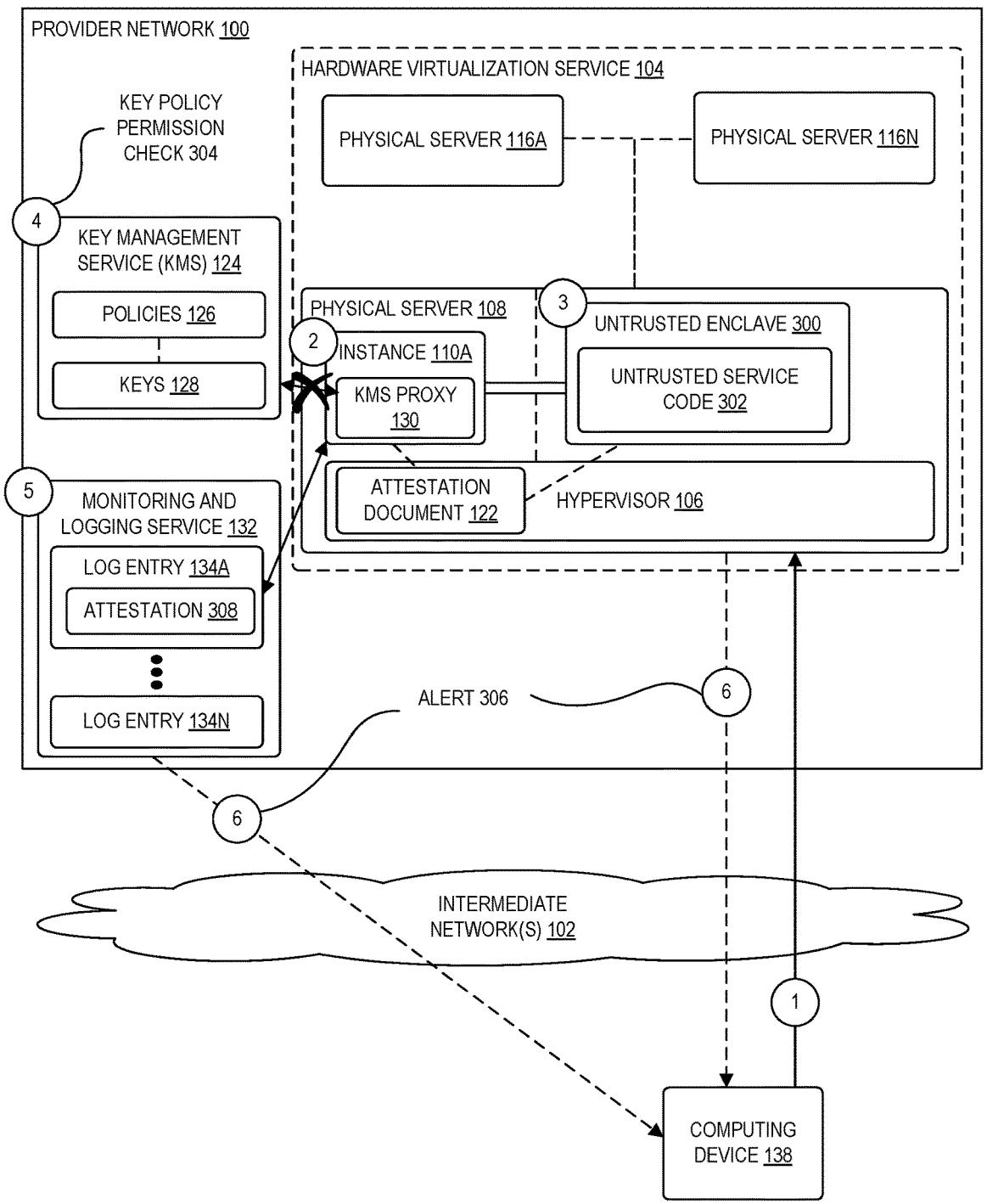
FIG. 3 is a diagram illustrating the generation of an alert responsive to detecting the use of an unverified or unexpected enclave by a cloud provider service according to some embodiments.

FIG. 3 is a diagram illustrating the generation of an alert responsive to detecting the use of an unverified or unexpected enclave by a cloud provider service according to some embodiments. In FIG. 3, at circle "1," a computing device 138 again generates a request involving user data. At circle "2," the request is received by code executing on an instance 110A. Similar to FIG. 1, the instance 110A can include an application or service implementing an HTTP or other API endpoint for receiving requests from other computing devices desiring to interact with a service of the provider network 100. In FIG. 3, the code executing on the instance 110A extracts SSL/TLS-encrypted data from the request and attempts to provide the SSL/TLS-encrypted data.

In some embodiments, the instance 110A detects that an untrusted enclave 300 running untrusted service code 302 has been launched and terminates the request. For example, the untrusted enclave 300 might have been generated based on an update that was performed without updating the corresponding code running in the instance 110A. The detection of the untrusted enclave 300, for example, can be based on a hash digest obtained from an attestation document 122 generated by the hypervisor 106 for the untrusted enclave 300.

In some embodiments, the instance 110A does not determine whether the enclave 300 is trusted or not and instead, at circle "3," passes the SSL/TLS-encrypted data from the request to the untrusted enclave 300. In this example, the untrusted enclave 300, can decrypt the SSL/TLS-encrypted data and further request an encryption or decryption key from the key management service 124. In the example of FIG. 3, at circle "4," the key management service 124 performs a key policy permission check 304 and determines that the enclave 300 from which the request originates does not match a policy 126 associated with the requested key and deny the request. In some embodiments, at circle "5," a corresponding log entry is generated reflecting that the untrusted enclave 300 attempted to obtain the key and, optionally, an alert 306 is sent to the computing device 138 from which the request originated. In this manner, a user can be alerted when an enclave other than one the user has specified in a policy 126 attempts to obtain a key 128 to be used to interact with the user's data.

Figure 4:
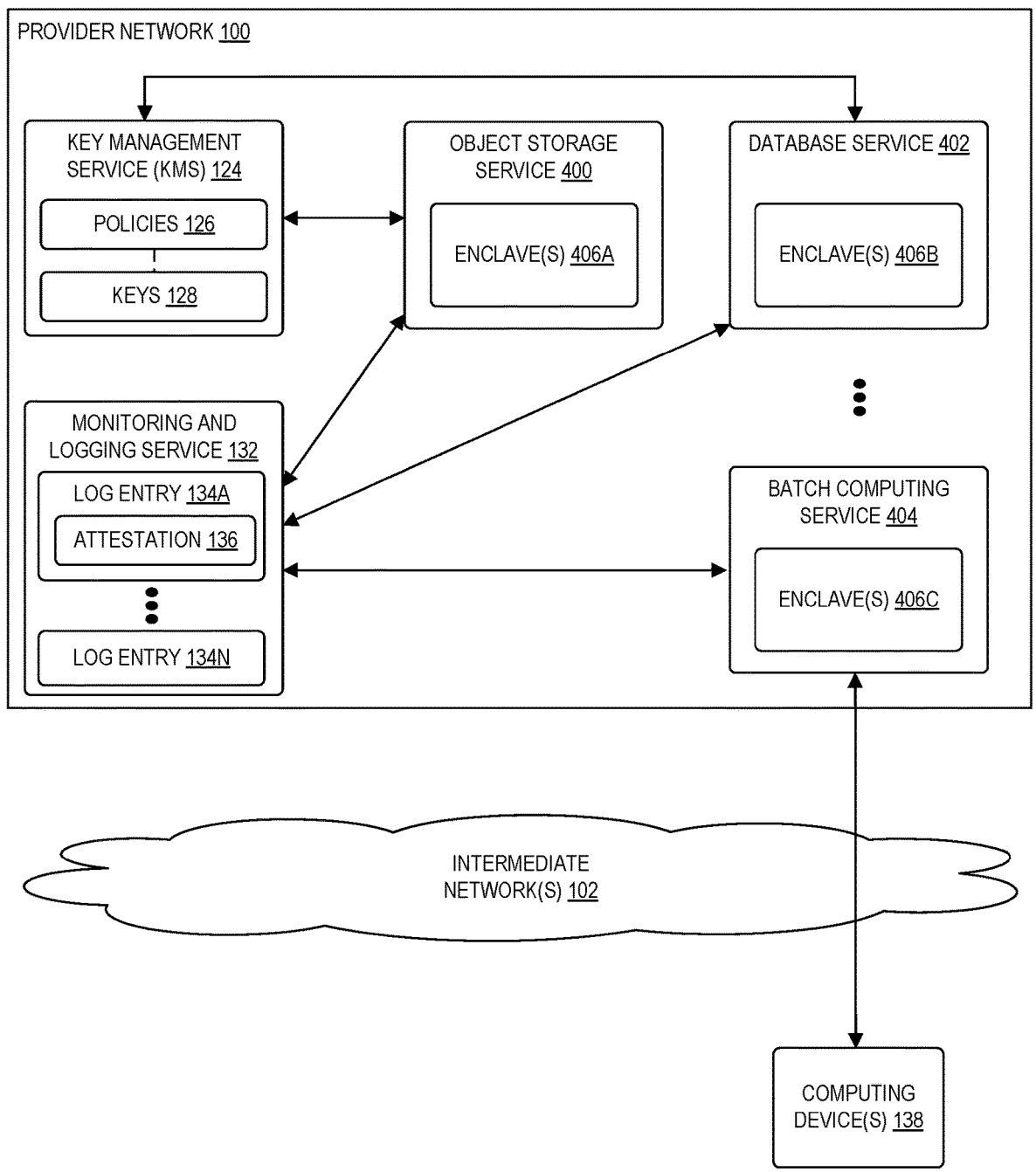
FIG. 4 is a diagram illustrating example types of services of a cloud provider using enclaves to process user data according to some embodiments.

FIG. 4 is a diagram illustrating example types of services of a cloud provider using enclaves to process user data according to some embodiments. In some of the examples above, an object storage service 400 was provided as an example of a service that can use an enclave to process user data at points in between the security of user data in transit and at rest, and can further provide users with access to attestation data verifying the use of a trusted enclave. Other examples of services that can use enclaves in a similar manner include a database service 402 or a batch computing service 404, where each such service can include a respective enclave and enclave applications (e.g., enclaves 406A, 406B, 406C) to process user data at certain points in time. In general, any service can make use of an enclave and provide user access to attestation data where user assurance of code executing at the service provider 100 is desired.

Figure 5:
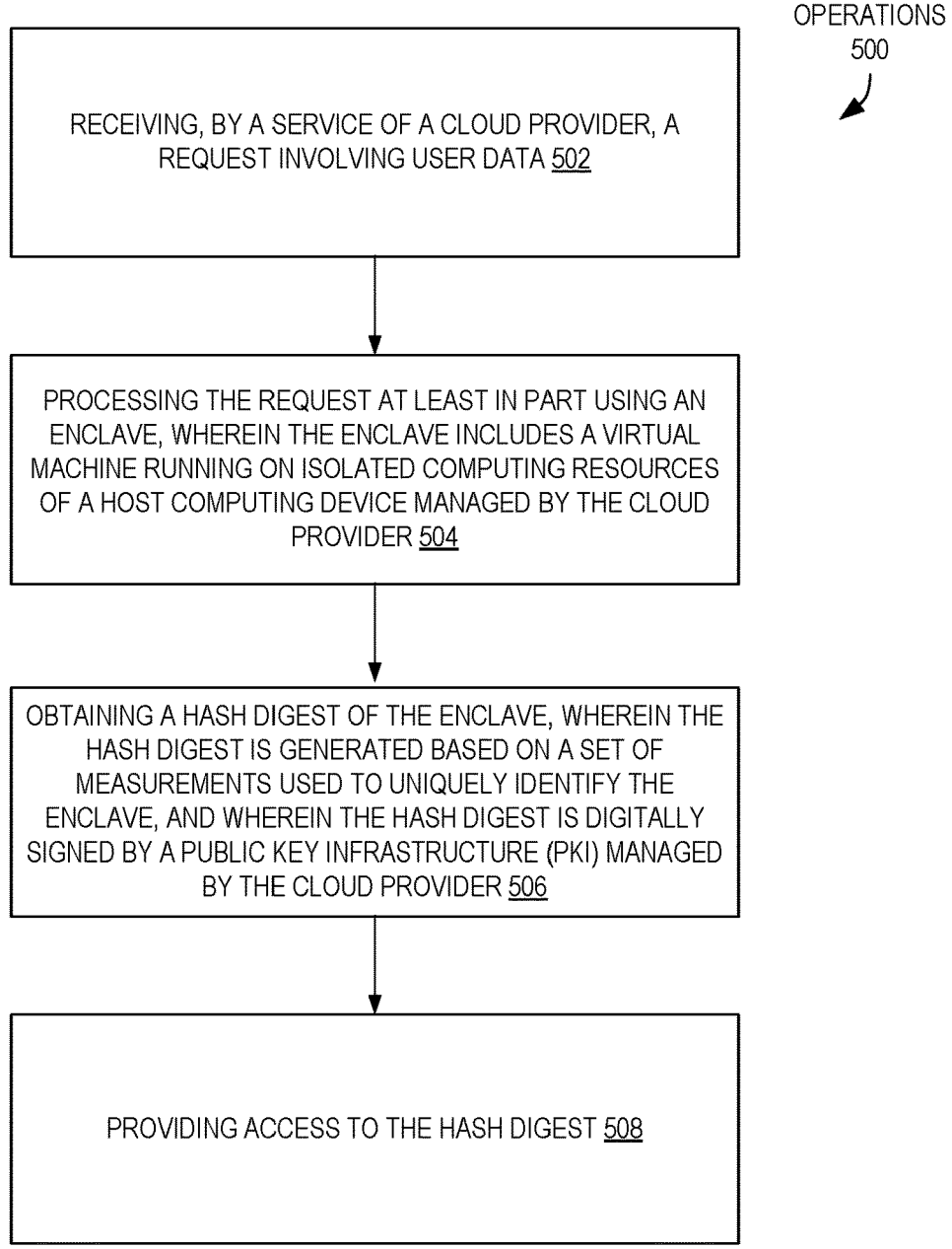
FIG. 5 is a flow diagram illustrating operations of a method for providing access to cryptographic attestations of enclaves used by a cloud provider service to process user data according to some embodiments.

FIG. 5 is a flow diagram illustrating operations 500 of a method for enabling users of cloud provider services to verify, via cryptographic attestations, that trusted enclaves are used to process user data according to some embodiments. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 500 are performed by an object storage service, database service, or other service of a provider network 100 illustrated in the figures.

The operations 500 include, at block 502, receiving, by a service of a cloud provider, a request involving user data.

The operations 500 further include, at block 504, processing the request at least in part using an enclave, wherein the enclave includes a virtual machine running on isolated computing resources of a host computing device managed by the cloud provider.

The operations 500 further include, at block 506, obtaining a hash digest of the enclave, wherein the hash digest is generated based on a set of measurements used to uniquely identify the enclave, and wherein the hash digest is digitally signed by a public key infrastructure (PKI) managed by the cloud provider.

The operations 500 further include, at block 508, providing access to the hash digest.

In some embodiments, the enclave includes an application that is associated with at least one of: source code used to implement the application and that is available in a public source code repository, or a third-party security audit of source code used to implement the application.

In some embodiments, the user data is encrypted in the request using a cryptographic protocol used to establish a secure connection between the service and a computing device from which the request originates.

In some embodiments, the operations further include obtaining, by the enclave, an encryption key from a key management service, wherein the enclave obtains the encryption key via a proxy running on a parent instance, and wherein the enclave communicates with the parent instance using a secure local channel.

In some embodiments, providing access to the hash digest includes at least one of: storing a log entry including the hash digest, or sending a response including the hash digest to a computing device from which the request originates.

In some embodiments, the service is an object storage service, wherein the request is a request to store a data object using the object storage service, and wherein the enclave implements a subset of the operations performed by the object storage to store the data object.

In some embodiments, the request is a first request, and the operations further include: receiving a second request involving user data: determining that the service has launched an untrusted enclave to process the second request, wherein the untrusted enclave is associated with an unrecognized hash digest: and generating an alert identifying the untrusted enclave.

In some embodiments, the operations further include sending, to a key management service, a request for an encryption key, wherein the request includes the hash digest of the enclave: determining, by the key management service, that the hash digest does not match a hash digest specified in a policy associated with the encryption key: and denying the request for the encryption key.

In some embodiments, the hash digest is obtained from a hypervisor running the enclave and a parent instance of the enclave on the host computing device.

In some embodiments, the request is processed at least in part using a plurality of enclaves including the enclave, and the operations further include: obtaining a plurality of hash digests corresponding to the plurality of enclaves: and providing access to the plurality of hash digests.

Figure 6:
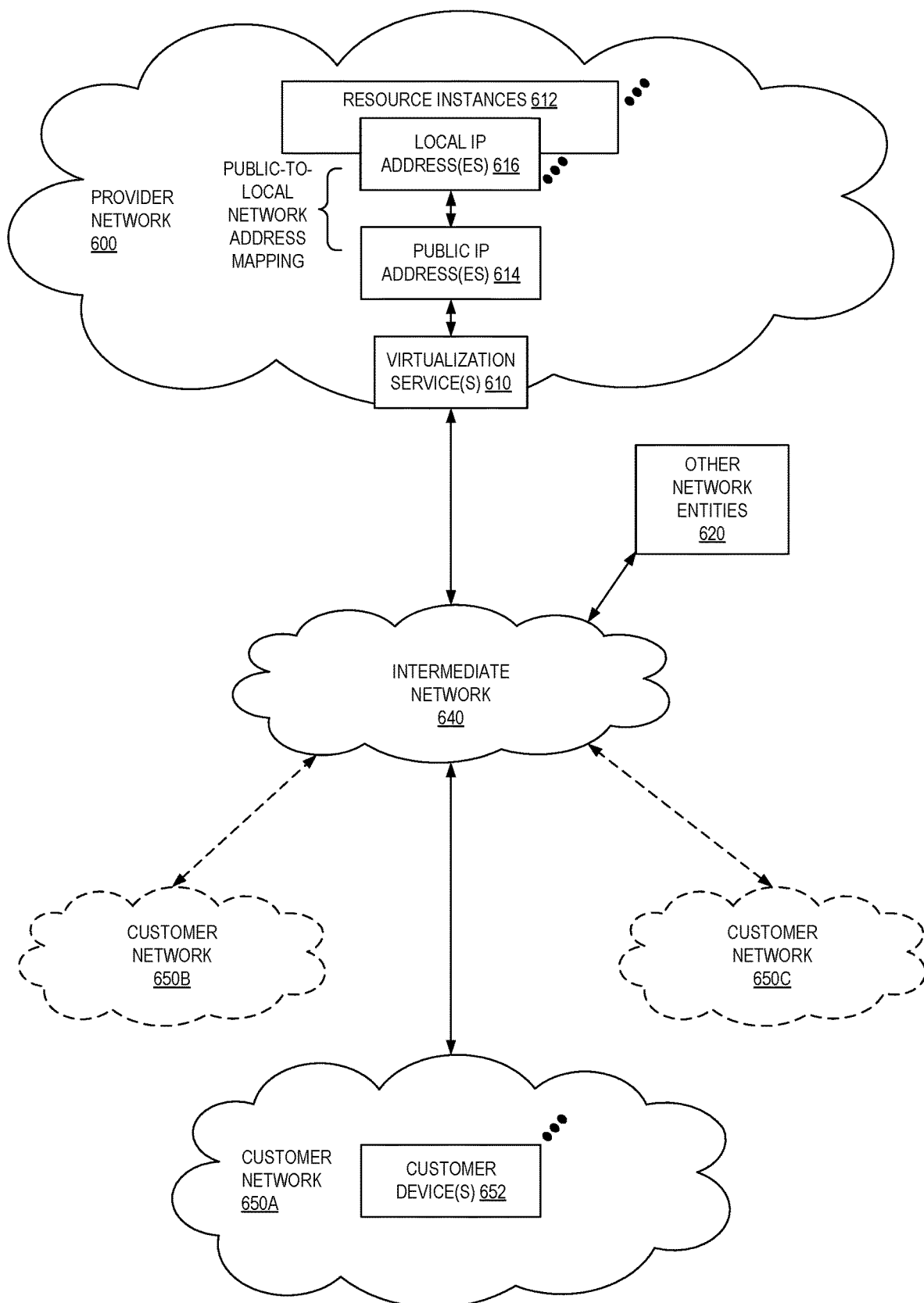
FIG. 6 illustrates an example provider network environment according to some embodiments.

FIG. 6 illustrates an example provider network (or "service provider system") environment according to some embodiments. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612: the local IP addresses are the internal network addresses of the resource instances 612 on the provider network 600. In some embodiments, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C: the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses: instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances: these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
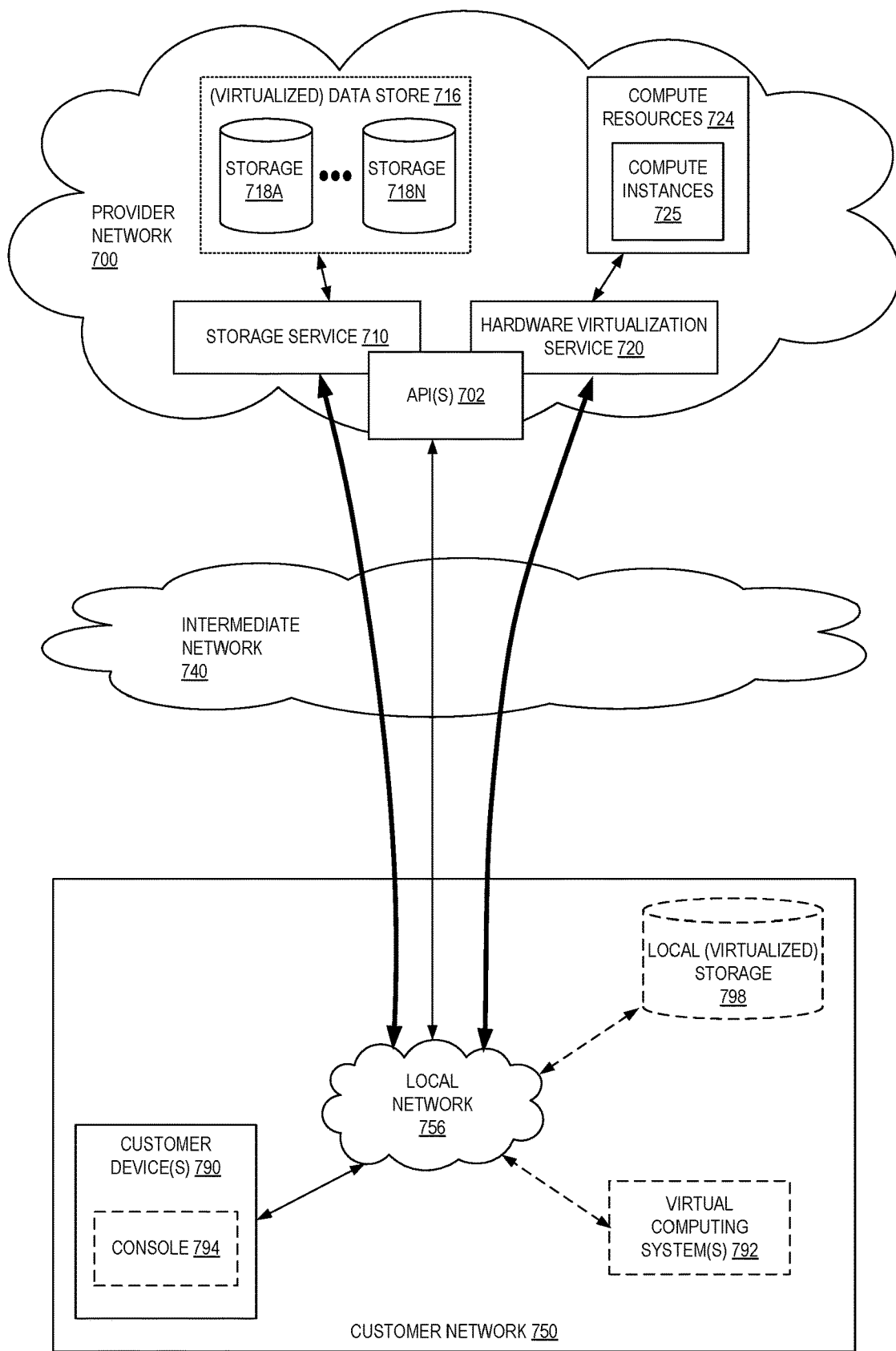
FIG. 7 is a block diagram of an example provider network that provides a storage service and a hardware virtualization service to customers according to some embodiments.

FIG. 7 is a block diagram of an example provider network environment that provides a storage service and a hardware virtualization service to customers, according to some embodiments. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740) and to the provider network 700. In some embodiments, the hardware virtualization service 720 can provide one or more APIs 702, for example a web services interface, via which the customer network 750) can access functionality provided by the hardware virtualization service 720, for example via a console 794 (e.g., a web-based application, standalone application, mobile application, etc.) of a customer device 790. In some embodiments, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket." a virtualized volume, a database, etc.) provided by the provider network 700. In some embodiments, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some embodiments, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Figure 8:
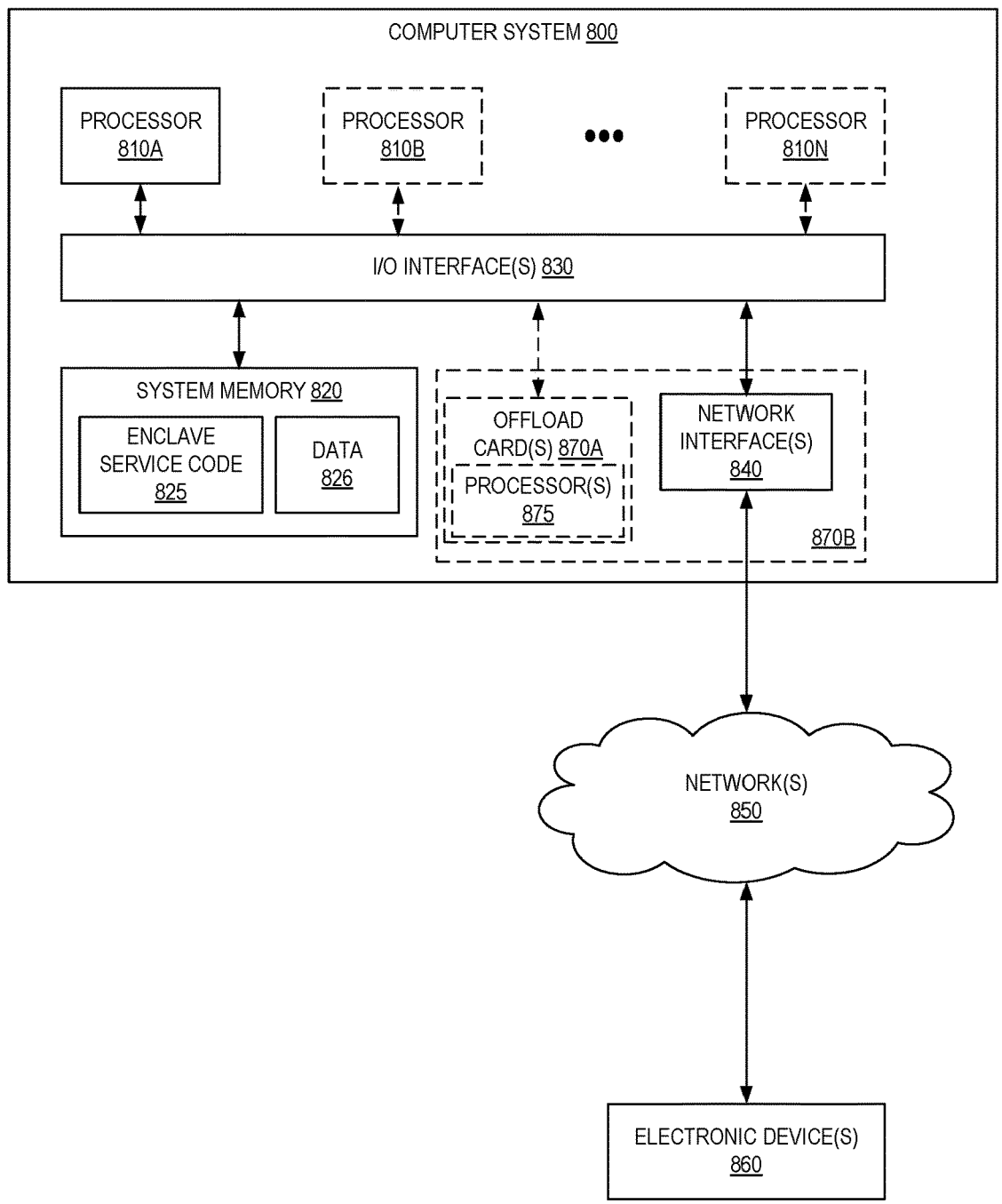
FIG. 8 is a block diagram illustrating an example computer system that can be used in some embodiments.

In some embodiments, a system that implements a portion or all of the techniques described herein can include a general-purpose computer system, such as the computer system 800 illustrated in FIG. 8, that includes, or is configured to access, one or more computer-accessible media. In the illustrated embodiment, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various embodiments the computer system 800 can include one computing device or any number of computing devices configured to work together as a single computer system 800.

In various embodiments, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various embodiments, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various embodiments, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 820 as enclave service code 825 (e.g., executable to implement, in whole or in part, the enclave 114) and data 826.

In some embodiments, the I/O interface 830 can be configured to coordinate I/O traffic between the processor 810, the system memory 820, and any peripheral devices in the device, including the network interface 840 and/or other peripheral interfaces (not shown). In some embodiments, the I/O interface 830 can perform any necessary protocol, timing, or other data transformations to convert data signals from one component (e.g., the system memory 820) into a format suitable for use by another component (e.g., the processor 810). In some embodiments, the I/O interface 830 can include support for devices attached through various types of peripheral buses, such as a variant of the Peripheral Component Interconnect (PCI) bus standard or the Universal Serial Bus (USB) standard, for example. In some embodiments, the function of the I/O interface 830 can be split into two or more separate components, such as a north bridge and a south bridge, for example. Also, in some embodiments, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various embodiments, the network interface 840) can support communication via any suitable wired or wireless general data networks, such as types of Ethernet network, for example. Additionally, the network interface 840) can support communication via telecommunications/ telephony networks, such as analog voice networks or digital fiber communications networks, via storage area networks (SANs), such as Fibre Channel SANs. and/or via any other suitable type of network and/or protocol.

In some embodiments, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations, such as pausing and/or un-pausing compute instances, launching and/or terminating compute instances, performing memory transfer/copying operations, etc. These management operations can, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and cannot coordinate with (or service) any separate hypervisor.

In some embodiments, the system memory 820 can be one embodiment of a computer-accessible medium configured to store program instructions and data as described above. However, in other embodiments, program instructions and/ or data can be received, sent, or stored upon different types of computer-accessible media. Generally speaking, a computer-accessible medium can include any non-transitory storage media or memory media such as magnetic or optical media. e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840).

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely available protocols, such as Transmission Control Protocol/Internet Protocol (TCP/IP). File Transfer Protocol (FTP).

Universal Plug and Play (UPnP). Network File System (NFS). Common Internet File System (CIFS). Extensible Messaging and Presence Protocol (XMPP). AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers. File Transfer Protocol (FTP) servers. Common Gateway Interface (CGI) servers, data servers. Java servers, business application servers, etc. The server(s) also can be capable of executing programs or scripts in response requests from user devices, such as by executing one or more Web applications that can be implemented as one or more scripts or programs written in any programming language, such as JavaR. C. C # or C++, or any scripting language, such as Perl. Python. PHP, or TCL, as well as combinations thereof. The server(s) can also include database servers, including without limitation those commercially available from Oracle(R). Microsoft(R). Sybase(R). IBM(R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM. ROM. Electrically Erasable Programmable Read-Only Memory (EEPROM), flash memory or other memory technology. Compact Disc-Read Only Memory (CD-ROM). Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
   obtaining, by a service of a cloud provider, a request involving user data, wherein the user data is encrypted in the request using a cryptographic protocol used to establish a secure connection between the service and a computing device from which the request originates, wherein the cryptographic protocol is terminated within an enclave, and wherein the user data is in plaintext only within the enclave;
   processing the request at least in part using the enclave, wherein the enclave includes a virtual machine running on isolated computing resources of a host computing device managed by the cloud provider;
   obtaining a hash digest of the enclave, wherein the hash digest is generated based on a set of measurements used to uniquely identify the enclave, and wherein the hash digest is digitally signed by a public key infrastructure (PKI) managed by the cloud provider; and
   providing access to the hash digest.

2. The computer-implemented method of claim 1, wherein the enclave includes an application that: decrypts the user data included in the request, obtains an encryption key from a key management service, and encrypts the user data using the encryption key, and wherein the method further comprises:
   sending, to a key management service, a request for the encryption key, wherein the request includes the hash digest of the enclave;
   determining, by the key management service, that the hash digest does not match a hash digest specified in a policy associated with the encryption key; and
   preventing the enclave from accessing the encryption key.

3. The computer-implemented method of claim 1, wherein the enclave includes an application that is associated with at least one of: source code used to implement the application and that is available in a public source code repository, or a third-party security audit of source code used to implement the application.

4. The computer-implemented method of claim 1, further comprising obtaining, by the enclave, an encryption key from a key management service, wherein the enclave obtains the encryption key via a proxy running on a parent instance, and wherein the encryption key is encrypted for access by only the enclave.

5. The computer-implemented method of claim 1, wherein providing access to the hash digest includes at least one of: storing a log entry including the hash digest, or sending a response including the hash digest to a computing device from which the request originates.

6. The computer-implemented method of claim 1, wherein the service is an object storage service, wherein the request is a request to store a data object using the object storage service, and wherein the enclave implements a subset of the operations performed by the object storage service to store the data object.

7. The computer-implemented method of claim 1, wherein the request is a first request, and wherein the method further comprises:
   receiving a second request involving user data;
   determining that the service has launched an untrusted enclave to process the second request, wherein the untrusted enclave is associated with an unrecognized hash digest; and
   generating an alert identifying the untrusted enclave.

8. The computer-implemented method of claim 1, further comprising:
   sending, to a key management service, a request for an encryption key, wherein the request includes the hash digest of the enclave;
   determining, by the key management service, that the hash digest does not match a hash digest specified in a policy associated with the encryption key; and
   denying the request for the encryption key.

9. The computer-implemented method of claim 1, wherein the hash digest is obtained from a hypervisor running the enclave and a parent instance of the enclave on the host computing device.

10. The computer-implemented method of claim 1, wherein the request is processed at least in part using a plurality of enclaves including the enclave, and wherein the method further comprises:
    obtaining a plurality of hash digests corresponding to the plurality of enclaves; and
    providing access to the plurality of hash digests.

11. A system comprising:
    a first one or more electronic devices to implement a service in a cloud provider, wherein the service includes instructions that upon execution cause the service to:
      receive a request involving user data, wherein the user data is encrypted in the request using a cryptographic protocol used to establish a secure connection between the service and a computing device from which the request originates, wherein the cryptographic protocol is terminated within an enclave, and wherein the user data is in plaintext only within the enclave,
      process the request at least in part using the enclave, wherein the enclave includes a virtual machine running on isolated computing resources of a host computing device managed by the cloud provider, wherein the enclave includes an application that:

decrypts the user data included in the request, and encrypts the user data using an encryption key obtained from a key management service, send, to a key management service, a request for the encryption key, wherein the request includes a hash digest of the enclave, receive the encryption key, obtain a hash digest of the enclave, wherein the hash digest is generated based on a set of measurements used to uniquely identify the enclave, and wherein the hash digest is digitally signed by a public key infrastructure (PKI) managed by the cloud provider, and provide access to the hash digest; and a second one or more electronic devices to implement a key management service in the cloud provider, wherein the key management service includes instructions that upon execution cause the key management service to:

determine that the hash digest matches a hash digest specified in a policy associated with the encryption key, and send the encryption key to enclave.

12. The system of claim 11, wherein the application is associated with at least one of: source code used to implement the application and that is available in a public source code repository, or a third-party security audit of source code used to implement the application.

13. The system of claim 11, wherein the service includes instructions that upon execution further cause the service to: obtain, by the enclave, an encryption key from a key management service, wherein the enclave obtains the encryption key via a proxy running on a parent instance, and wherein the enclave communicates with the parent instance using a secure local channel.

14. The system of claim 11, wherein providing access to the hash digest includes at least one of: storing a log entry including the hash digest, or sending a response including the hash digest to a computing device from which the request originates.

15. The system of claim 11, wherein the service is an object storage service, wherein the request is a request to store a data object using the object storage service, and wherein the enclave implements a subset of the operations performed by the object storage to store the data object.

16. A computer-implemented method comprising:

obtaining, by a service of a cloud provider, a request involving user data;

obtaining, by an enclave, an encryption key from a key management service, wherein the enclave obtains the encryption key via a proxy running on a parent instance, and wherein the encryption key is encrypted for access by only the enclave;

processing the request at least in part using the enclave, wherein the enclave includes a virtual machine running on isolated computing resources of a host computing device managed by the cloud provider;

obtaining a hash digest of the enclave, wherein the hash digest is generated based on a set of measurements used to uniquely identify the enclave, and wherein the hash digest is digitally signed by a public key infrastructure (PKI) managed by the cloud provider; and providing access to the hash digest.

17. The computer-implemented method of claim 16, wherein the enclave includes an application that is associated with at least one of: source code used to implement the application and that is available in a public source code repository, or a third-party security audit of source code used to implement the application.

18. The computer-implemented method of claim 16, wherein providing access to the hash digest includes at least one of: storing a log entry including the hash digest, or sending a response including the hash digest to a computing device from which the request originates.

19. The computer-implemented method of claim 16, wherein the service is an object storage service, wherein the request is a request to store a data object using the object storage service, and wherein the enclave implements a subset of the operations performed by the object storage service to store the data object.

20. The computer-implemented method of claim 16, wherein the hash digest is obtained from a hypervisor running the enclave and a parent instance of the enclave on the host computing device.

* * * * *